United States Patent
Kagawa

(10) Patent No.: US 9,610,716 B2
(45) Date of Patent: Apr. 4, 2017

(54) CONNECTOR HOUSING

(71) Applicant: YAZAKI CORPORATION, Minato-ku, Tokyo (JP)

(72) Inventor: Atsushi Kagawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 205 days.

(21) Appl. No.: 14/454,037

(22) Filed: Aug. 7, 2014

(65) Prior Publication Data

US 2014/0346708 A1  Nov. 27, 2014

Related U.S. Application Data

(63) Continuation of application No. 13/989,094, filed on May 23, 2013, now abandoned.

(30) Foreign Application Priority Data

Nov. 24, 2010  (JP) ................................. 2010-261565

(51) Int. Cl.
*B29C 45/00* (2006.01)
*C08J 5/04* (2006.01)
(Continued)

(52) U.S. Cl.
CPC ........... *B29C 45/0005* (2013.01); *C08J 5/043* (2013.01); *C08K 3/40* (2013.01); *C08K 7/14* (2013.01); *B29K 2067/006* (2013.01); *B29K 2105/12* (2013.01); *B29K 2309/08* (2013.01); *B29K 2995/0082* (2013.01); *B29L 2031/30* (2013.01); *B29L 2031/3481* (2013.01); *C08J 2367/02* (2013.01); *Y10T 428/1314* (2015.01); *Y10T 428/1352* (2015.01)

(58) Field of Classification Search
CPC .. C08K 7/14; C08K 3/40; C08L 67/02; B29C 45/0005; B29K 2067/006; B29K 2105/12; B29K 2309/08; B29K 2995/0082; B29L 2031/30; B29L 2031/3481; C08J 2367/02; C08J 5/043; Y10T 428/1314; Y10T 428/1352
See application file for complete search history.

(56) References Cited

U.S. PATENT DOCUMENTS

| | | | | |
|---|---|---|---|---|
| 6,545,081 B1 * | 4/2003 | Nishihata | ................. | C08K 3/04 428/412 |
| 6,930,583 B2 * | 8/2005 | Kawai | ..................... | H01F 38/12 336/198 |
| 2011/0160364 A1 * | 6/2011 | Toyohara | ................ | C08L 67/02 524/117 |

FOREIGN PATENT DOCUMENTS

| | | | | |
|---|---|---|---|---|
| CA | 2005900 | * | 6/1990 | ............. C08K 7/02 |
| EP | 2053091 | * | 4/2009 | ............. C08L 67/04 |

(Continued)

OTHER PUBLICATIONS

Chinese official action issued on Oct. 31, 2014 in the counterpart Chinese application with its English translation.
(Continued)

*Primary Examiner* — Arti Singh-Pandey
(74) *Attorney, Agent, or Firm* — Mots Law, PLLC

(57) ABSTRACT

A connector housing (1) is molded by using a resin material essentially containing a polybutylene terephthalate reinforced with fibers, the polybutylene terephthalate having properties with a flexural modulus of 5000 to 7000 MPa as measured by ASTM D790 and a bar flow length of 80 to 130 mm.

5 Claims, 2 Drawing Sheets

(51) Int. Cl.
*C08K 7/14* (2006.01)
*C08K 3/40* (2006.01)
*B29K 67/00* (2006.01)
*B29K 105/12* (2006.01)
*B29K 309/08* (2006.01)
*B29L 31/30* (2006.01)
*B29L 31/34* (2006.01)

(56) References Cited

FOREIGN PATENT DOCUMENTS

| | | |
|---|---|---|
| JP | H02-173047 A | 7/1990 |
| JP | 2610671 B2 | 5/1997 |
| JP | 2004-269550 A | 9/2004 |

OTHER PUBLICATIONS

Korean office action letter issued on Mar. 25, 2015 in the counterpart Korean application.
Japanese official action issued on Sep. 9, 2014 in the counterpart Japan patent application. (Partial English translation also submitted.).
Korean office action letter issued on Sep. 23, 2014.
Japanese office action letter issued on Nov. 18, 2014.
Notification of Reexamination issued on Aug. 18, 2016 in the counterpart Chinese patent application.
Official Action issued on Oct. 7, 2016 in the counterpart European patent application.
Notification of Reexamination issued on Apr. 13, 2016 in the counterpart Chinese patent application.
Decision on Appeal issued on Nov. 23, 2016 in the counterpart Korean patent application.

* cited by examiner

CONNECTOR HOUSING

CROSS REFERENCE TO RELATED APPLICATION

This application is a continuation of application of Ser. No. 13/989,094, filed on May 23, 2013, which is based upon and claims the benefit of priority under 35 USC 119 from prior Japanese Patent Application No. 2010-261565, filed on Nov. 24, 2010; the entire contents of which are incorporated herein by reference.

TECHNICAL FIELD

The present invention relates to a connector housing for an automobile in which wire harnesses and terminal fittings are incorporated, and particularly relates to a connector housing that achieves reduction in a cycle time for molding.

BACKGROUND ART

A connector housing for an automobile is injection-molded of a resin. Polyamides such as nylon, polyolefins such as polypropylene, polyesters such as polyethylene terephthalate and polybutylene terephthalate, and polycarbonates are used in the molding. Among these, polybutylene terephthalate (hereinafter, abbreviated to PBT) is often used since PBT has excellent mechanical properties, electrical properties, heat resistance, water resistance, and the like. Moreover, PBT is a crystalline resin, and leads to high productivity by achieving a fast crystallization rate, and solidification in a short time. Due to these advantages, PBT is frequently used as a molding material of a connector housing for an automobile.

Along with reduction in size of wire harnesses and the like, there has been a demand for reduction in size and thickness of the connector housings. In conventional practice using PBT as the molding material of the connector housing, fibers such as glass fibers are added to the PBT to meet such demand and also to increase the strength of the connector housing. Patent Literature 1 describes a conventional technique of adding fibers, in which glass fibers having flat cross sections and glycerol esters of fatty acids are mixed into PBT.

CITATION LIST

Patent Literature

[PTL 1] Japanese Unexamined Patent Application Publication No. 2009-155367

SUMMARY OF INVENTION

However, a resin material in which fibers are mixed into PBT is so reduced in liquidity that it is difficult to apply an injection pressure to the resin material sufficiently. This causes not only a problem of an increase in a cycle time for molding, but also a problem of occurrences of defects such as sink marks and short shot due to insufficient filling of the resin material into a mold. If the molding temperature is increased to secure the liquidity for solving the above problems, this may cause other problems of increasing the risk of thermal degradation of the resin material and of reducing the durability of a molded product.

An object of the present invention is to provide a connector housing which can be molded without increasing a cycling time for molding, without forming a sink mark or short shot, and without needing a high temperature, even if PBT including added fibers is used as a resin material.

An aspect of the present invention is a connector housing molded by using a resin material essentially containing a polybutylene terephthalate reinforced with fibers, the polybutylene terephthalate having properties with a flexural modulus of 5000 to 7000 MPa as measured by ASTM D790 and a bar flow length of 80 to 130 mm.

In the aspect described above, the connector housing, even reduced in thickness, can have a sufficiently high strength owing to the use of the resin material essentially containing the fiber-reinforced PBT with the flexural modulus of 5000 to 7000 MPa as measured by ASTM D790.

Moreover, the resin material essentially containing this fiber-reinforced PBT has the bar flow length of 80 to 130 mm, and therefore has a high liquidity. Thus, the resin material can be filled in a mold in a satisfactory condition, even if the molding is performed at a relatively low molding temperature. Thus, a defect such as a sink mark or short shot does not occur. Moreover, since the molding temperature does not need be set to a very high temperature, the cycle time for molding is reduced with reduction in the cooling time after the molding, and the connector housing can be produced at a lower cost.

The fibers may be glass fibers.

The configuration described above makes it possible to easily obtain the fiber-reinforced PBT having the above-described properties, because the use of the glass fibers as the fibers enables selection of glass fibers having a length, diameter, weight, and the like suitable for the properties of PBT.

DESCRIPTION OF EMBODIMENTS

Figure 1:
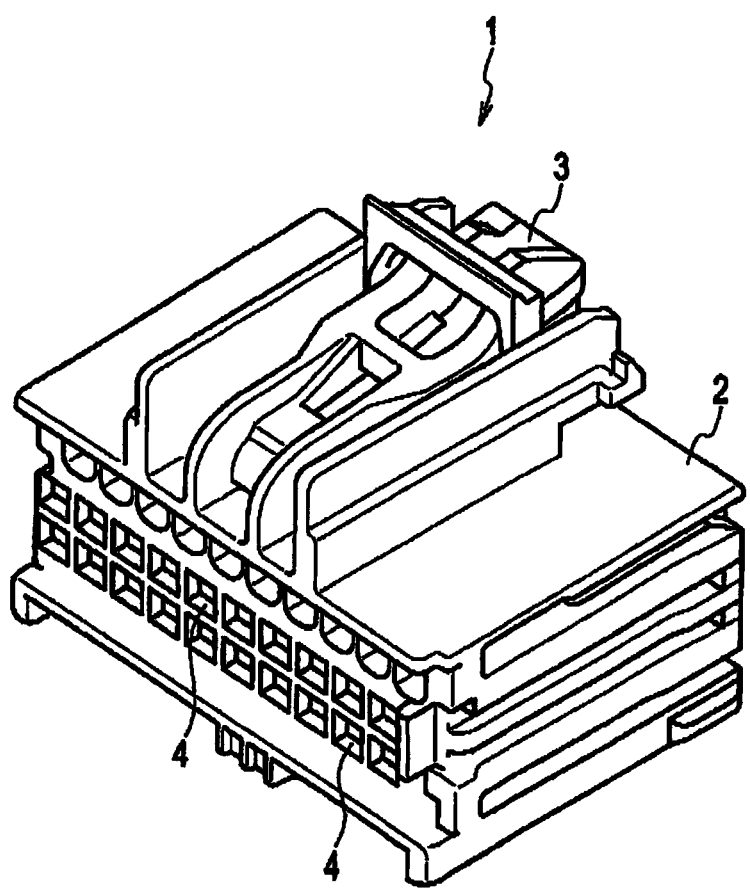
FIG. 1 is a perspective view of a connector housing produced in an embodiment of the present invention.

A connector housing of the present invention is molded by using a resin material essentially containing a fiber-reinforced polybutylene terephthalate (fiber-reinforced PBT). Although the molding may be performed here by any of injection molding, extrusion molding, compression molding and the like, the injection molding is preferable in terms of moldability.

PBT is a thermoplastic polyester obtained from polycondensation reaction between butanediol having 4 carbon atoms (1,4-butanediol) and terephthalic acid or dimethyl terephthalate. Generally, PBT is a resin which has excellent heat resistance, chemical resistance, electrical properties, dimension stability, and moldability. The degree of polymerization of PBT is selected appropriately depending on a relationship between PBT and fibers added to PBT, in consideration of the liquidity of the resin material in a mold, the strength of the resin, and other conditions.

Glass fibers, carbon fibers, alumina fibers, zirconia fibers or other fibers may be used as the fibers. These types of fibers may be used solely, or in combination. Adding these fibers to PBT can impart mechanical strength and impact strength to a molded product, and also can suppress curvature deformation. Among these types of fibers, the glass fibers are preferable in that the glass fibers allows appropriate selection of the length, diameter, weight and the like of the fibers suitable for PBT, and has excellent conformability to PBT. The proportional ratio of the glass fiber to PBT is selected such that the flexural modulus and melt viscosity of the fiber-reinforced PBT as the resin material fall within respective ranges of values described below.

A resin material essentially containing the fiber-reinforced PBT of the present invention has properties with a flexural modulus of 5000 to 7000 MPa as measured by ASTM D790 and a bar flow length of 80 to 130 mm. In the present invention, the polymerization of PBT, the length and diameter of the fibers, the proportional ratio of the fiber to PBT, and other conditions are set in such a way that the flexural modulus and the melt viscosity fall within the respective ranges described above.

The flexural modulus corresponds to the flexural modulus of the resin material. If the flexural modulus is below 5000 MPa, a connector housing as the molded product has a very low strength, and thus cannot be reduced in thickness. In contrast, the flexural modulus over 7000 MPa makes the strength of the connector housing higher than necessary, and also adversely affects the moldability of the resin material. This excessive flexural modulus also causes a problem that: the resin material comes to have poor expansibility and contractility with respect to the temperature, and accordingly has lower adaptability to the environmental temperature; and cracks thus may occur in the connector housing due to a change in the environmental temperature.

The flexural modulus only needs to fall within the range of 5000 to 7000 MPa, more preferably within a range of 5500 to 6000 MPa. The use of the resin material having such a flexural modulus enables the conneter housing to have a sufficiently high strength even if the connector housing is reduced in thickness.

The measurement of flexural modulus in conformity with ASTM D790 can be performed by using, for example, Autograph (trade name) manufactured by Toyo Seiki Seisaku-sho, LTD. In this measurement, a three-point bending test is performed in which: a specimen is placed on supporting tables arranged at an interval; and a concentrated load is applied to the center of the specimen from above.

The bar flow length is a factor relating to the liquidity of the resin material in a mold. If the bar flow length is 130 mm or longer, the resin material has a higher liquidity than necessary, and molding defects such as flash occur. If the bar flow length is shorter than 80 mm, the liquidity of the resin material is too low. Thus, the resin material flows in a mold at a low speed, which makes it difficult to fill the entire mold with the resin material. This causes a short shot or sink mark in the molded connector housing.

The bar flow length only needs to fall within the range of 80 to 130 mm, preferably within a range of 90 to 120 mm. The use of the resin material having such a bar flow length enables satisfactory filling of the resin material into the mold at a relatively low molding temperature without forming any defect such as a sink mark or short shot. Moreover, since the molding temperature does not need rise to a very high temperature, the cycle time of molding is reduced with a reduction in the cooling time after the molding, and the connector housing thus can be produced at a lower cost.

The bar flow length was measured here using a cavity having a depth of 0.5 mm, a width of 15 mm, and a length of 380 mm, at a resin temperature of 260 degrees Celsius, a mold temperature of 60 degrees Celsius, and an injection pressure of 150 MPa.

The resin material of the present invention may include one or more other kinds of resins, as long as the resin material essentially contains the fiber-reinforced polybutylene terephthalate having properties with the flexural modulus of 5000 to 7000 MPa as measured by ASTM D790 and the bar flow length of 80 to 130 mm. One or more kinds of polyesters such as polyethylene terephthalate and polytrimethylene terephtalate, polyolefins such as polypropylene, polyamides such as nylon, polycarbonates, polystyrenes, polyacetals, and the like may be used as the other resins.

Antioxidant, an ultra violet-light absorbing agent, a lubricant, a mold release agent, an antistatic agent, and a coloring agent, such as pigment and dye, may be mixed into the resin material of the present invention depending on the necessity.

Example

FIG. 1 shows a connector housing 1 formed in this example. The connector housing 1 is formed by integrally including a housing main body 2, and a lock portion 3 on top of the housing main body 2. The lock portion 3 is connectable to a mating connector.

Multiple mating-terminal insertion holes 4 into which mating terminals are respectively insertable are opened in the housing main body 2.

The back side of each of the mating-terminal insertion holes 4 communicates with a terminal housing chamber into which a terminal fitting attached to a wire end is insertable. The connector housing 1 of the embodiment is provided with two rows of the mating-terminal insertion holes 4 which are arranged one on top of the other, each row including ten mating-terminal insertion holes 4 arranged laterally.

Figure 2:
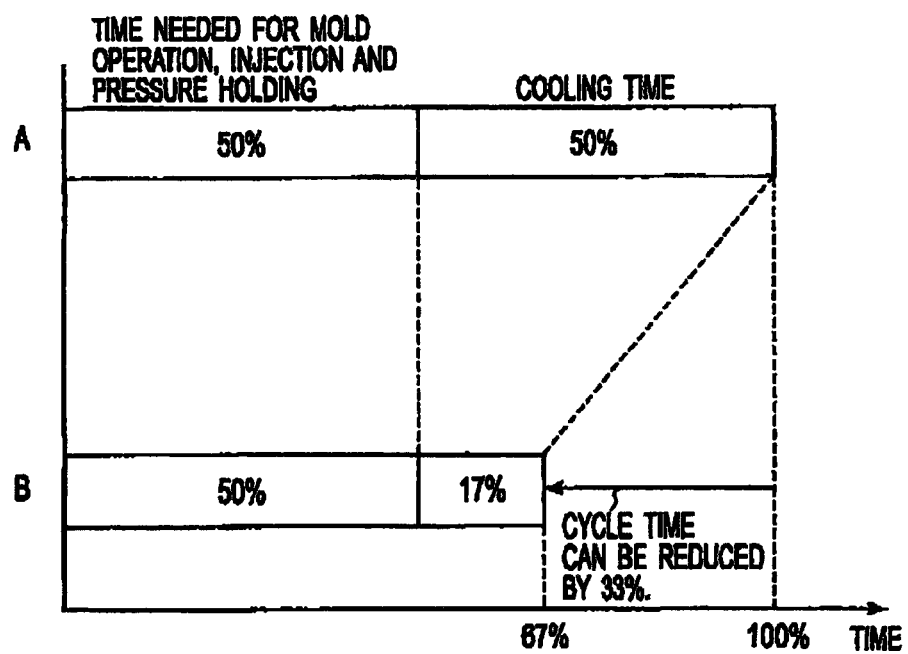
FIG. 2 is a flowchart showing a molding cycle of production of the embodiment of the present invention and a molding cycle of conventional production.

FIG. 2 shows cycle times for molding the connector housing 1 of FIG. 1 by injection molding. Reference sign A represents a cycle time of a comparative example, and reference sign B represents a cycle time of this example. The molding of the connector housing 1 was performed as follows. A mold was closed at the start of the molding, and then the resin material was injected into the mold. After the resin material was held in the mold under pressure for a certain period, cooling including measurement was performed. Thereafter, the mold was opened and the molding was completed.

In either of Comparative Example A and Example B, the molding was performed by using a resin material in which glass fibers were blended into PBT. Comparative example A used a glass fiber-reinforced PBT (SK602 manufactured by Du Pont) having properties with a flexural modulus of 4700 MPa as measured by ASTM D790 and a bar flow length of 49 mm. Example B used a glass fiber-reinforced PBT (SF315AC manufactured by Polyplastics Co., Ltd.) having properties with a flexural modulus of 5799 MPa as measured by ASTM D790 and a bar flow length of 116 mm, and also used a glass fiber-reinforced PBT (5101GF01 manufactured by Toray Industries, Inc.) having properties with a flexural modulus of 5537 MPa as measured by ASTM D790 and a bar flow length of 97 mm.

As shown in FIG. 2, the cooling time accounts for 50% of the entire cycle in Comparative Example A. Meanwhile, Example B can reduce the cooling time to 17% of the entire cycle of Comparative Example A.

In Comparative Example A, the resin material has a higher melt viscosity than that of Example B, and accordingly has a lower liquidity. Hence, the mold temperature in molding needs to be set higher, and the cooling time becomes accordingly longer. On the other hand, in Example B, the resin material has a lower melt viscosity, and accordingly has a higher liquidity. Hence, Example B can be molded at a mold temperature lower than Comparative Example A. Thus, as shown by an arrow in FIG. 2, Example B reduces the molding cycle time by 33%, compared to Comparative Example A.

The embodiment of the present invention has been described above. However, the present invention is not limited to the embodiment described above, and various modifications can be made.

The invention claimed is:

1. A molding method for making a connector housing, the housing formed of a resin material consisting essentially of a polybutylene terephthalate reinforced with fibers, the polybutylene terephthalate having a flexural modulus of 5000 to 7000 MPa as measured by ASTM D790 and a bar flow length of 80 to 130 mm, the method comprising:
    closing a mold at the start of a mold cycle,
    injecting the resin material into the mold,
    holding the resin material in the mold under pressure for a defined period, cooling the mold, and
    after the mold cooling step, opening the mold,
    wherein based on the use of the resin material having the flexural modulus and the bar flow length, the mold cooling step time is significantly less than the time duration sum for the mold injecting step and the pressure holding step.

2. The molding method of claim 1, wherein the mold cooling step time is about one fourth, and the time duration sum of the mold injecting step and the pressure holding step is about three quarters with respect to total mold cycle time.

3. The molding method of claim 1, wherein the flexural modulus of the polybutylene terephthalate is within the range 5500 to 6000 MPa.

4. The molding method of claim 1, wherein the connector housing integrally includes a housing main body and a lock portion on top of the housing main body.

5. The molding method of claim 1, wherein the molding is performed by using a resin material in which glass fibers are blended into the polybutylene terephthalate.

* * * * *